United States Patent
Waldron (10) Patent No.: US 9,280,650 B2
(45) Date of Patent: Mar. 8, 2016

(54) AUTHENTICATE A FINGERPRINT IMAGE

(75) Inventor: James Robert Waldron, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 86 days.

(21) Appl. No.: 13/877,661

(22) PCT Filed: Oct. 15, 2010

(86) PCT No.: PCT/US2010/052800
§ 371 (c)(1),
(2), (4) Date: Apr. 4, 2013

(87) PCT Pub. No.: WO2012/050585
PCT Pub. Date: Apr. 19, 2012

(65) Prior Publication Data
US 2013/0198826 A1 Aug. 1, 2013

(51) Int. Cl.
*G06F 21/32* (2013.01)
*G06K 9/00* (2006.01)

(52) U.S. Cl.
CPC ............ *G06F 21/32* (2013.01); *G06K 9/00006* (2013.01)

(58) Field of Classification Search
CPC ..... H04L 63/083; H04L 63/08; H04L 63/067; H04L 63/0876; H04L 63/0838; H04L 63/0853; H04L 637/22; G06F 21/31; G06F 11/3438
See application file for complete search history.

(56) References Cited

U.S. PATENT DOCUMENTS

| 5,495,411 | A  | * | 2/1996 | Ananda ............................ 705/32 |
| 6,256,402 | B1 | * | 7/2001 | Terao ............................. 382/125 |
| 7,502,761 | B2 |   | 3/2009 | Siegal et al. |
| 7,613,919 | B2 |   | 11/2009 | Bagley |
| 7,996,683 | B2 | * | 8/2011 | Lyseggen et al. ............. 713/186 |
| 2001/0023483 | A1 | * | 9/2001 | Kiyomoto ...................... 713/186 |
| 2004/0044896 | A1 | * | 3/2004 | Kelley et al. .................. 713/183 |
| 2004/0139355 | A1 | * | 7/2004 | Axel et al. ..................... 713/202 |
| 2005/0222963 | A1 | * | 10/2005 | Johnson .......................... 705/67 |

(Continued)

FOREIGN PATENT DOCUMENTS

| CN | 1209605 | 3/1999 |
| CN | 1870003 | 11/2006 |

(Continued)

OTHER PUBLICATIONS

Guorong Xuan et al., "A Secure Internet-Based Personal Identity Verification System Using Lossless Watermarking and Fingerprint Recognition", The 3rd International Workshop on Digital Watermarking, Korea Seoul, Oct. 2004, pp. 55-65. http://link.springer.com/chapter/10.1007%2F978-3-540-31805-7_5.*
International Search Report mailed Jul. 27, 2011, PCT/US2010/052800 filed Oct. 15, 2010.

*Primary Examiner* — Hadi Armouche
*Assistant Examiner* — Cheng-Feng Huang
(74) *Attorney, Agent, or Firm* — HP Legal Department (57) ABSTRACT

A computing machine including a sensor to capture a fingerprint image from a user and generate a password in response to the user accessing the sensor, a component to create a package of the fingerprint image and the password, and a processor to authenticate the fingerprint image from the package before decrypting an encryption of the password if a request for the password has been received before a predefined time has elapsed.

12 Claims, 7 Drawing Sheets

(56) References Cited

U.S. PATENT DOCUMENTS

| | | |
|---|---|---|
| 2008/0028447 A1 | 1/2008 | O'Malley et al. |
| 2008/0036572 A1* | 2/2008 | Muller .................. 340/5.82 |
| 2008/0162943 A1* | 7/2008 | Ali et al. ................ 713/185 |
| 2008/0178008 A1 | 7/2008 | Takahashi et al. |
| 2009/0158033 A1 | 6/2009 | Jeong et al. |
| 2009/0287936 A1* | 11/2009 | Ohkado ................ 713/183 |

FOREIGN PATENT DOCUMENTS

| | | |
|---|---|---|
| JP | 2001273498 | 10/2001 |
| JP | 2006172180 | 6/2006 |
| JP | 2007164244 | 6/2007 |
| JP | 2009020650 | 1/2009 |
| KR | 200900022425 | 3/2009 |

* cited by examiner

AUTHENTICATE A FINGERPRINT IMAGE

BACKGROUND

When authenticating a user with a biometric device, a service provider initially sends a request for user authentication to a computing machine of the user. In response, the computing machine can configure the biometric device to capture biometric information of the user. The computing machine can then send the biometric information to a server to authenticate. If the biometric information is successfully authenticated, the server can notify the service provider that the user has successfully been authenticated or the server can provide user credentials to the service provider.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the disclosed embodiments.

DETAILED DESCRIPTION

A sensor can capture a fingerprint image from a user and generate a password in response to the user accessing the sensor. In response, a package can efficiently be created of the fingerprint image and the password. By insuring that the user is present at the computing machine before generating the password, a security of the password and the package can be increased. Additionally, by utilizing a processor to authenticate the fingerprint image in response to receiving a request for the password, the password can securely be decrypted and provided to a device. As a result, an efficiency and protection for the user and the password can be increased by reducing a number of entities to provide the fingerprint image and/or the password to.

Figure 1:
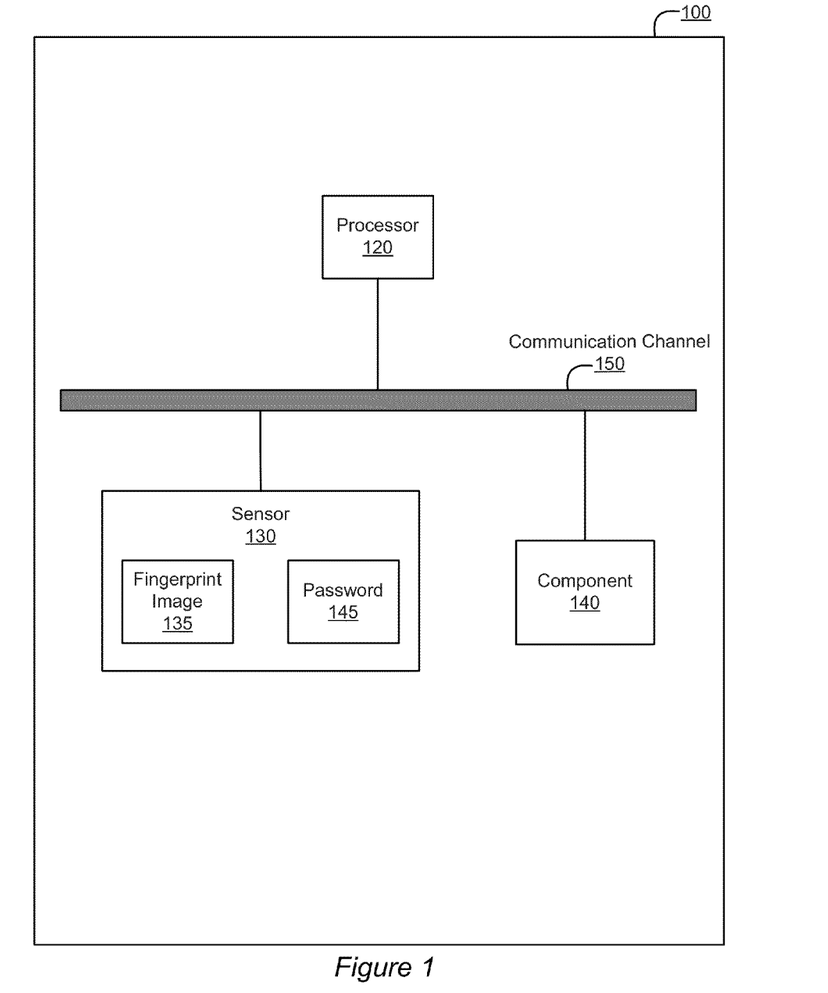
FIG. 1 illustrates a computing machine with a sensor and a component according to an embodiment.

FIG. 1 illustrates a computing machine 100 with a sensor 130 and a component 140 according to an embodiment. In one embodiment, the computing machine 100 is or includes a desktop, a laptop, a notebook, a tablet, a netbook, an all-in-one system, a server, and/or the like. In another embodiment, the computing machine 100 is a cellular device, a PDA, an E-Reader, and/or any additional computing device which can include one or more sensors 130.

As illustrated in FIG. 1, the computing machine 100 includes a processor 120, a sensor 130, a component 140 and a communication channel 150 for the computing machine 100 and/or one or more components of the computing machine 100 to communicate with one another. In one embodiment, the computing machine 100 additionally includes a storage device and the storage device includes an authentication application. In other embodiments, the computing machine 100 includes additional components and/or is coupled to additional components in addition to and/or in lieu of those noted above and illustrated in FIG. 1.

As noted above, the computing machine 100 includes a processor 120. The processor 120 can send data and/or instructions to the components of the computing machine 100, such as the sensor 130, the component 140, and/or the authentication application. Additionally, the processor 120 can receive data and/or instructions from components of the computing machine 100, such as the sensor 130, the component 140, and/or the authentication application.

The authentication application is an application which can be utilized in conjunction with the processor 120 to manage an authentication of a user. In one embodiment, the authentication application can be a biometric framework of the computing machine 100. When managing an authentication of the user, a sensor 130 of the computing machine 100 can capture a fingerprint image 135 from the user and generate a password in response to the user accessing the sensor 130. For the purposes of this application, a user can be any person which can access the computing machine 100 and/or the sensor 130. The sensor 130 is a biometric device configured to capture a fingerprint image 135 and/or any additional information from the user and proceed to generate a password 145.

For the purposes of this application, the fingerprint image 135 is an image of the user's fingerprint. The password 145 can include one or more sequence of numbers and/or characters, one or more signatures, and/or one or more software or hardware tokens. In response to the sensor 130 capturing the fingerprint image 135 from the user and generating the password 145, a component 140 of the computing machine 100 can proceed to generate a package of the fingerprint image 135 and the password. The component 140 is a software and/or hardware component of the computing machine 100 configured to generate packages and encrypt and/or decrypt the fingerprint image 135 and/or the password 145. In one embodiment, the component 140 can be a firmware driver of the sensor 130.

In response to the package of the fingerprint image 135 and the password 145 being created, the processor 120 can proceed to authenticate the fingerprint image 135. If the fingerprint image 135 is successfully authenticated, the processor 120 can proceed to detect a request for the password 145. The request can be a signal or instruction from a device coupled to the computing machine 100 prompting the processor 120 and/or the authentication application to provide the password 145. In response to receiving the request, the processor 120 and/or the authentication application can proceed to decrypt one or more encryptions of the password 145 and provide the device the decrypted password 145

The authentication application can be firmware which is embedded onto the processor 120, the computing machine 100, and/or the storage device of the computing machine 100. In another embodiment, the authentication application is an application stored on the computing machine 100 within ROM or on the storage device accessible by the computing machine 100. In other embodiments, the authentication application is stored on a computer readable medium readable and accessible by the computing machine 100 or the storage device from a different location.

Additionally, in one embodiment, the storage device is included in the computing machine 100. In other embodiments, the storage device is not included in the computing machine 100, but is accessible to the computing machine 100 utilizing a network interface included in the computing machine 100. The network interface can be a wired or wireless network interface card. In other embodiments, the storage device can be configured to couple to one or more ports or interfaces on the computing machine 100 wirelessly or through a wired connection.

In a further embodiment, the authentication application is stored and/or accessed through a server coupled through a local area network or a wide area network. The authentication application communicates with devices and/or components coupled to the computing machine 100 physically or wirelessly through a communication bus 150 included in or attached to the computing machine 100. In one embodiment the communication bus 150 is a memory bus. In other embodiments, the communication bus 150 is a data bus.

Figure 2:
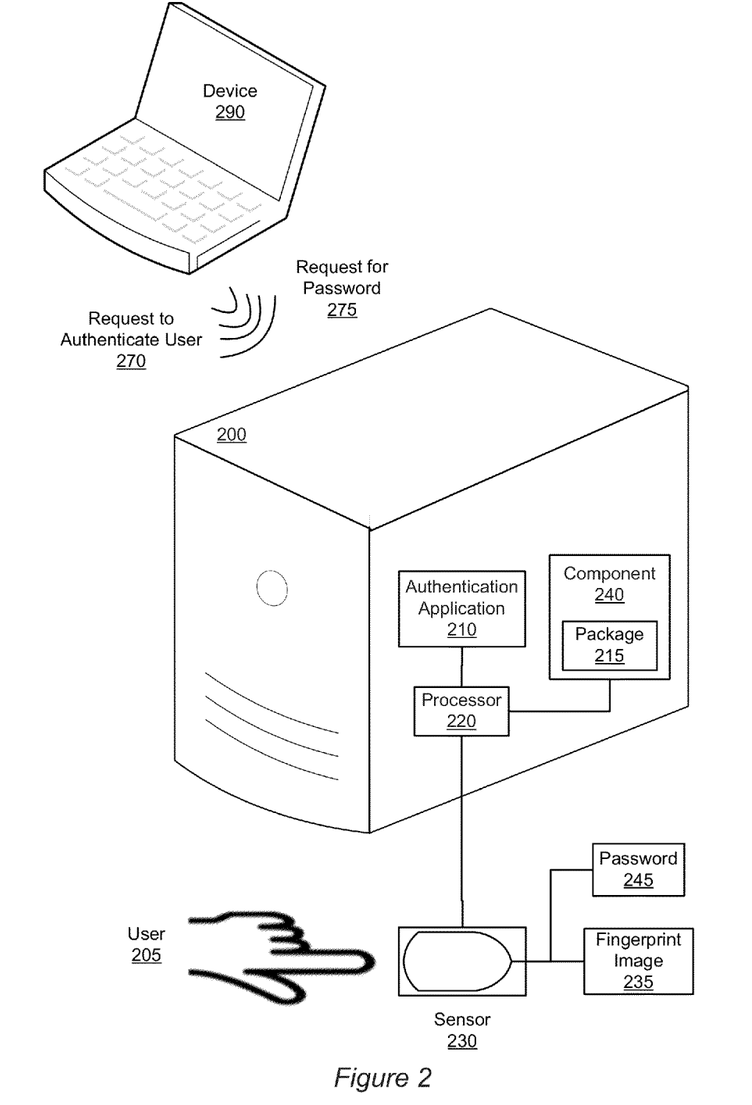
FIG. 2 illustrates a sensor capturing a fingerprint image of a user in response to a device communicating with a computing machine according to an embodiment.

FIG. 2 illustrates a sensor 230 capturing a fingerprint image 235 from a user 205 in response to a device 290 communicating with a computing machine 200 according to an embodiment. The device 290 can be a desktop, a laptop, a notebook, a tablet, a netbook, an all-in-one system, a server, a cellular device, a PDA, an E-Reader, and/or any additional device which can couple and communicate with the computing machine 200. In one embodiment, the device 290 can be a server, a service provider, and/or a merchant. The device 290 can couple and communicate with the computing machine 200 through a physical and/or through a wireless connection. The device 290 and the computing machine 200 can include one or more communication components configured to allow the device 290 and the computing machine 200 to communicate with one another through a physical and/or through a wireless connection.

As shown in FIG. 2, when communicating with the computing machine 200, the device 290 can send one or more requests as a signal and/or as an instruction to the computing machine 200. One or more requests can include a request to authenticate a user 270 and/or a request for a password 275 from the computing machine 200. In response to receiving the request to authenticate the user 270, the sensor 230 can proceed to capture a fingerprint image 235 of the user 205 and/or proceed to generate a password 245. In one embodiment, a processor 220 and/or an authentication application 210 of the computing machine 200 can send one or more instructions for the sensor 230 to capture the fingerprint image 235 and/or to generate the password 245.

As noted above, the sensor 230 is a biometric device configured to capture a fingerprint image 235 and/or any additional information from the user 205. The sensor 230 can be coupled or integrated to the computing machine 200 and/or one or more components of the computing machine 200. In one embodiment, the sensor 230 is or can include an image capture device and/or a fingerprint scanner. In other embodiments, the sensor 230 can be or include any additional device or component configured to capture a fingerprint image 235 and/or any additional information from the user 205.

The sensor 230 can capture the fingerprint image 235 from the user 205 in response the user 205 accessing the sensor 230. As illustrated in FIG. 2, in one embodiment, the user 205 can access the sensor 230 by physically touching the sensor 230 with a finger of the user 205. The sensor 230 can detect the finger of the user 205 and proceed to capture an image of the user's 205 fingerprint. The fingerprint image 235 can be created as data, information, and/or as a file by the sensor 230. In another embodiment, the sensor 230 can include a microphone and can also capture a voice of the user 205. In other embodiments, the sensor 230 can perform a retina scan of the user 205 and/or capture any additional information from the user 205 in addition to and/or in lieu of those noted above and illustrated in FIG. 2.

As noted above, the sensor 230 can also generate a password 245 in response to the user 205 accessing the sensor 230. The password 245 can be used by the device 290 to authenticate the user 205 and/or to verify an identity of the user 205. In one embodiment, the password 245 can be a one-time-password which can be randomly generated by the sensor 230 in response to the user 205 accessing the sensor 230. The password 245 can include one or sequence of numbers or characters. In another embodiment, the password 245 can include one or more digital signatures. In other embodiments, the password 245 can include any additional information which can be utilized by the device 290 to verify an identity of the user 205.

In one embodiment, the fingerprint image 235 and/or the password 245 can additionally be encrypted by the sensor 230. When encrypting the fingerprint image 235 and/or the password 245, the sensor 230 can utilize one or more encryption algorithms. In another embodiments, the sensor 230 can encrypt the fingerprint image 235 and/or the password 245 using one or more keys. In other embodiments, the sensor 230 can utilize one or more software/hardware tokens and/or any additional method to encrypt the fingerprint image 235 and/or the password 245 in addition to and/or in lieu of those noted above.

Using the encrypted fingerprint image 235 and the encrypted password 245, a component 240 of the computing machine 200 can generate a package 215 to include the fingerprint image 235 and the password 245. As noted above, the component 240 can be a software component, such as a firmware driver of the sensor 230. The component 240 can generate the package 215 of the fingerprint image 235 and the password 245 as a BLOB (Binary Large Object). In other embodiments, the component 240 can generate the package 215 as any additional type of file, data, and/or cluster which can include the fingerprint image 235 and the password 245 in addition to and/or in lieu of those noted above.

As noted above, the component 240 can additionally decrypt an encryption of the fingerprint image 235 and/or the password 245. In one embodiment, the component 240 can decrypt an encryption for both the fingerprint image 235 and the password 245. In another embodiment, the component 240 can decrypt the password 245, but leave an encryption of the password 245. When decrypting an encryption of the fingerprint image 235 and/or the password 245, the component 240 can use one or more decryption algorithms, one or more keys, and/or one or more hardware/software tokens. In other embodiments, the component 240 can decrypt the fingerprint image 235 and/or the password 245 using additional methods in addition to and/or in lieu of those noted above.

The component 240 can also re-encrypt a decrypted fingerprint image 235 and/or a decrypted password 245. By decrypting and/or re-encrypting the fingerprint image 235 and/or the password 245, the component 240 can act as a translator between one or more components of the computing machine 200, such as the sensor 230 and the processor 220 and/or the authentication application 210.

Additionally, by re-encrypting the fingerprint image 235 and/or the password 245, the component 240 can reinforce or improve a security of the fingerprint image 235 and/or the password 245. When re-encrypting the fingerprint image 235 and/or the password 245, the component 240 can use one or more encryption algorithms which are local to the component 240. In another embodiment, the component 240 can digitally sign the fingerprint image 235 and/or the password 245. In other embodiments, the component 240 can use one or more software/hardware tokens of the component 240 to encrypt the fingerprint image 235 and/or the password 245.

Once the package 215 has been generated, the component 240 can share the package 215 with the processor 220 and/or the authentication application 210. The processor 220 and/or the authentication application 210 can then attempt to authenticate the fingerprint image 215 from the user 205.

Figure 3:
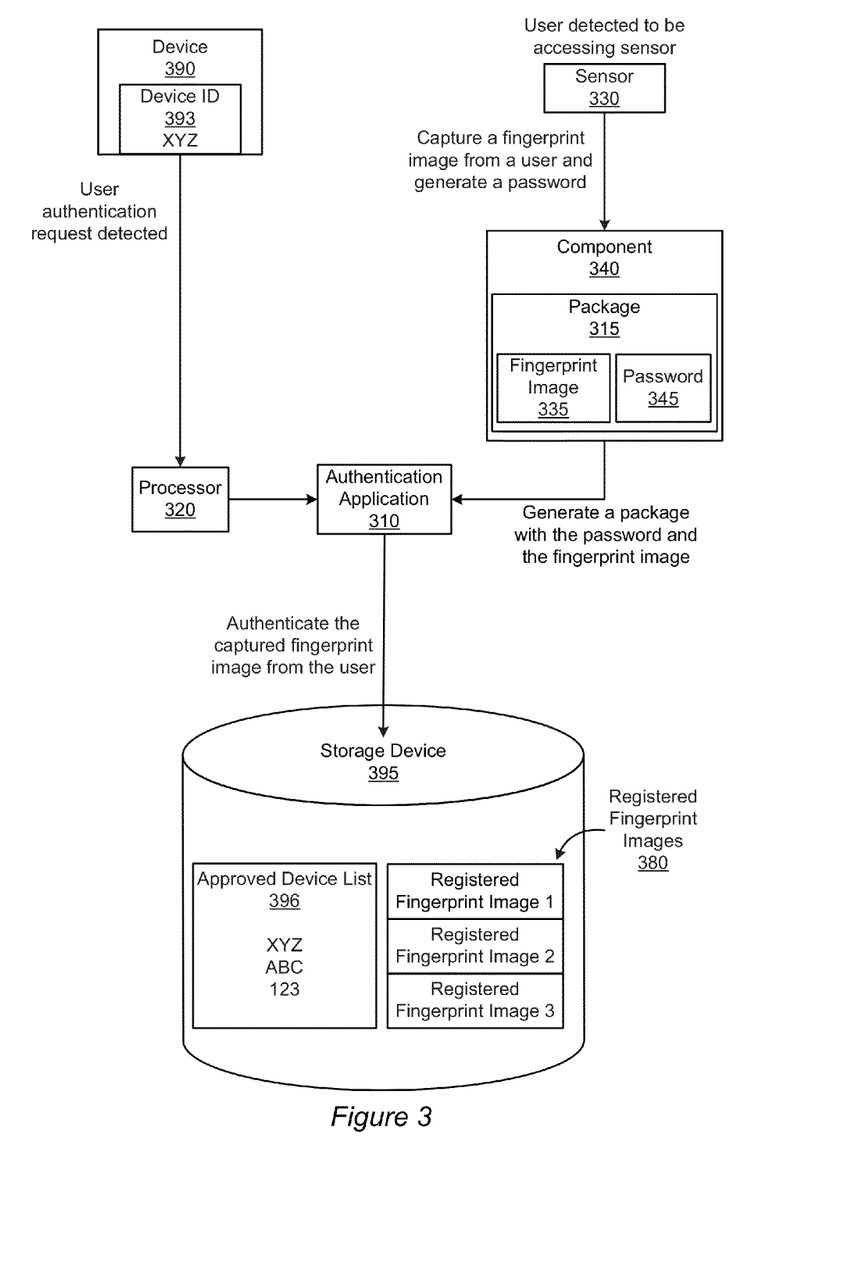
FIG. 3 illustrates a block diagram of a fingerprint image being captured and a password being generated in response to a processor receiving a user authentication request according to an embodiment.

FIG. 3 illustrates a block diagram of a fingerprint image 335 being captured and a password 345 being generated in response to a processor 320 and/or an authentication application 310 receiving a user authentication request according to an embodiment. As illustrated in FIG. 3, the processor 320 has detected a user authentication request. As noted above, the user authentication request can be sent to the processor 320 and/or the authentication application 310 by a device 390 coupled to the computing machine. In one embodiment, before processing the request, the processor 320 and/or the authentication application 310 can authenticate the device 390.

The processor 320 and/or the authentication application 310 can prompt the device 390 for an identification 393 of the device 390 and compare the identification 393 to an approved device list 396. The approved device list 396 can be stored on the computing machine and can list one or more devices which the processor 320 and/or the authentication application 310 determine to be secure. If the device 390 not on the approved device list 396, the processor 320 and/or the authentication application 310 can reject any requests from the device 396. If the device 396 is on the approved list, the processor 320 and/or the authentication application 310 can proceed to process the request and notify the sensor 330.

As shown in the present embodiment, the device 390 includes a device ID 393 of XYZ and XYZ is included in the approved device list 396. As a result, the device 390 is determined to be secure and the sensor 330 proceeds to detect a user accessing the sensor 330. In response to detecting the user accessing the sensor 330, the sensor 330 proceeds to capture a fingerprint image 335 from the user and proceeds to generate a password 345. The fingerprint image 335 and the password 345 can then be shared by a component 340 of the computing machine. In one embodiment, the sensor 330 can additionally encrypt the fingerprint image 335 and/or the password 345 using one or more of the methods noted above before sharing the fingerprint image 335 and the password 345 with the component 340.

Using the fingerprint image 335 and the password 345, the component 340 can proceed to create a package 315. As noted above, the package 315 can be created as a BLOB, which can include the fingerprint image 335 and the password 345. The package 315 can be shared with the processor 320 and/or the authentication application 310. In one embodiment, the component 340 can further encrypt the package 315 itself.

In another embodiment, before generating the package 315 and/or encrypting the package 315, the component 340 can decrypt an encryption of the fingerprint image 335 and the password 345 from the sensor 330. The component 340 can then re-encrypt the fingerprint image 335 and/or the password 345 using one or more encryptions local to the component 340. The component 340 can then share the package 315 with the processor 320 and/or the authentication application 310.

In response to receiving access to the package 315, the processor 320 and/or the authentication application 310 can attempt to authenticate the fingerprint image 335 in the package 315. In one embodiment, if the package 315 is encrypted, the processor 320 and/or the authentication application 310 can initially decrypt the package 315 using one or more keys, one or more hardware/software tokens, and/or one or more signatures. In another embodiment, if the fingerprint image 335 is encrypted, the processor 320 and/or the authentication application 310 can further decrypt the fingerprint image 335 before authenticating it. Once the package 315 and/or the fingerprint image 335 have been decrypted, the processor 320 and/or the authentication application 310 can attempt to authenticate the fingerprint image 335 using one or more registered fingerprint images 380.

Figure 4:
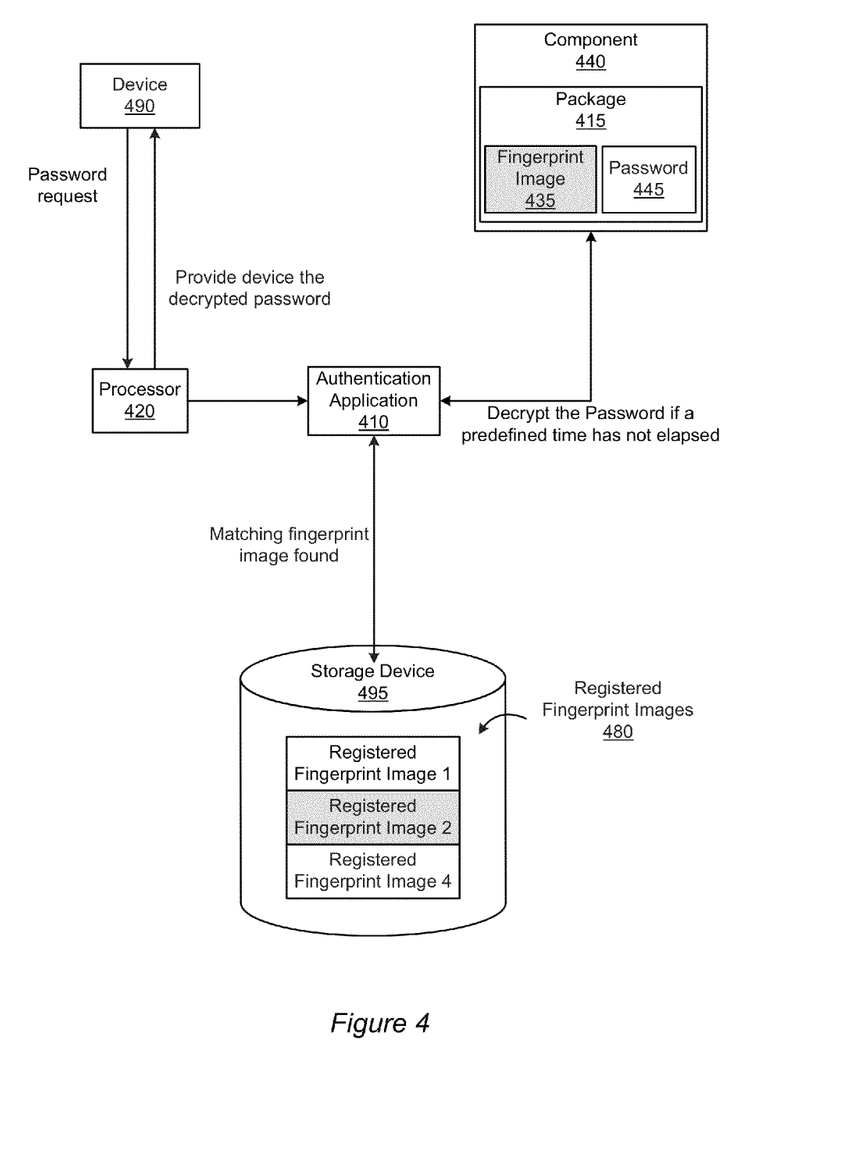
FIG. 4 illustrates a block diagram of a fingerprint image being authenticated to decrypt a password according to an embodiment.

FIG. 4 illustrates a block diagram of a fingerprint image 435 being authenticated to decrypt a password 445 according to an embodiment. As illustrated in FIG. 4, when authenticating the fingerprint image 435, the processor 420 and/or the authentication application 410 can access the fingerprint image 435 from the package 415 and compare the fingerprint image 435 to one or more registered fingerprint images 480 accessible to the processor 420 and/or the authentication application 410.

One or more registered fingerprint images 480 correspond to users authorized to use the computing machine. As shown in the present embodiment, one or more of the registered fingerprint images 480 can be stored on a storage device 495 of the computing machine. Additionally, one or more of the registered fingerprint images 480 can be stored in a database, a list, and/or in a file.

The processor 420 and/or the authentication application 410 can determine whether the fingerprint image 435 matches any of the registered fingerprint images 480. If no match is found, the processor 420 and/or the authentication application 410 can determine that authentication has failed. The processor 420 and/or the authentication application 410 can then proceed to delete the package 415, along with the fingerprint image 435 and/or the password 445.

In another embodiment, if a match is found, the processor 420 and/or the authentication application 410 can determine that the fingerprint image 435 was successfully authenticated and the user is registered to use the computing machine. As shown in FIG. 4, the processor 420 and/or the authentication application 410 have determined that the fingerprint image 435 matches registered fingerprint 2. In response, the processor 420 and/or the authentication application 410 can proceed to determine whether a request for the password 445 has been received from the device.

As shown in FIG. 4, the processor 420 and/or the authentication application 410 have detected a request for the password 445 from the device 490. As noted above, the processor 420 and/or the authentication application 410 previously determined that the device 490 is a secure device in response to verifying a device ID of the device 490. In response to receiving the request, the processor 420 and/or the authentication application 410 can proceed to decrypt the password 445 from the package 415.

In one embodiment, before decrypting the password 445, the processor 420 and/or the authentication application 410 can initially determine whether a predefined amount of time has elapsed. The predefined amount of time can be defined by the processor 420, the authentication application 410, and/or a user of the computing machine. Additionally, the processor 420 and/or the authentication application 410 can determine a time difference between when the user authentication request was first received and when the password request was received. In another embodiment, the processor 420 and/or authentication application 410 can calculate a time difference between when the fingerprint image 435 was authenticated and when the password request was received.

If predefined amount of time is less than the difference than either of the times noted above, the processor 420 and/or the authentication application 410 determine that the predefined amount of time has elapsed. The processor 420 and/or the authentication application 410 can then proceed to delete the password 445, the fingerprint image 435, and/or the package 415.

In another embodiment, if the predefined amount of time is greater than either of the times noted above, the predefined amount of time has not elapsed. The processor 420 and/or the authentication application 410 can then proceed to decrypt an encryption of the password 445. When decrypting the password 445, the processor 420 and/or the authentication application 410 can utilize one or more decryption algorithms, one or more keys, and/or one or more hardware/software tokens. In response to decrypting the password 445, the processor 420 and/or the authentication application 410 can provide the decrypted password 445 to the device 490.

Figure 5:
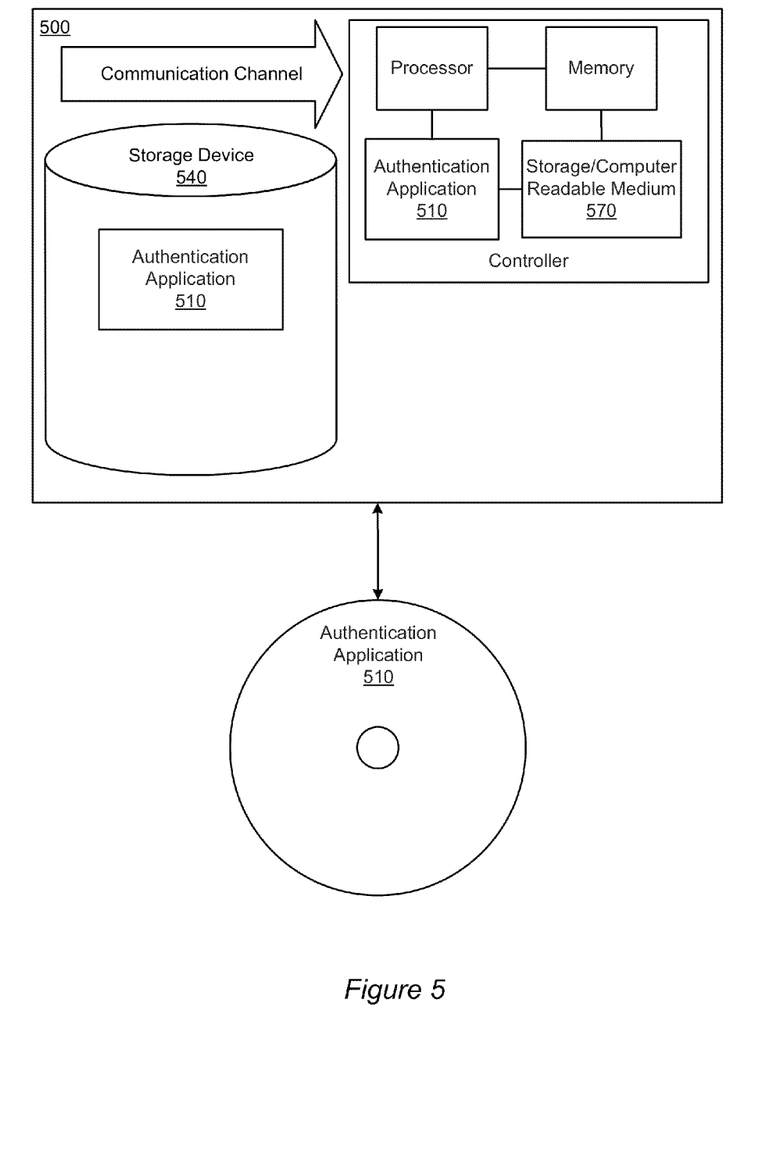
FIG. 5 illustrates an authentication application on a computing machine and the authentication application stored on a removable medium being accessed by the computing machine according to an embodiment.

FIG. 5 illustrates an authentication application 510 on a computing machine 500 and the authentication application 510 stored on a removable medium being accessed by the computing machine 500 according to an embodiment. For the purposes of this description, a removable medium is any tangible apparatus that contains, stores, communicates, or transports the application for use by or in connection with the computing machine 500. As noted above, in one embodiment, the authentication application 510 is firmware that is embedded into one or more components of the computing machine 500 as ROM. In other embodiments, the authentication application 510 is an application which is stored and accessed from a hard drive, a compact disc, a flash disk, a network drive or any other form of computer readable medium that is coupled to the computing machine 500.

Figure 6:
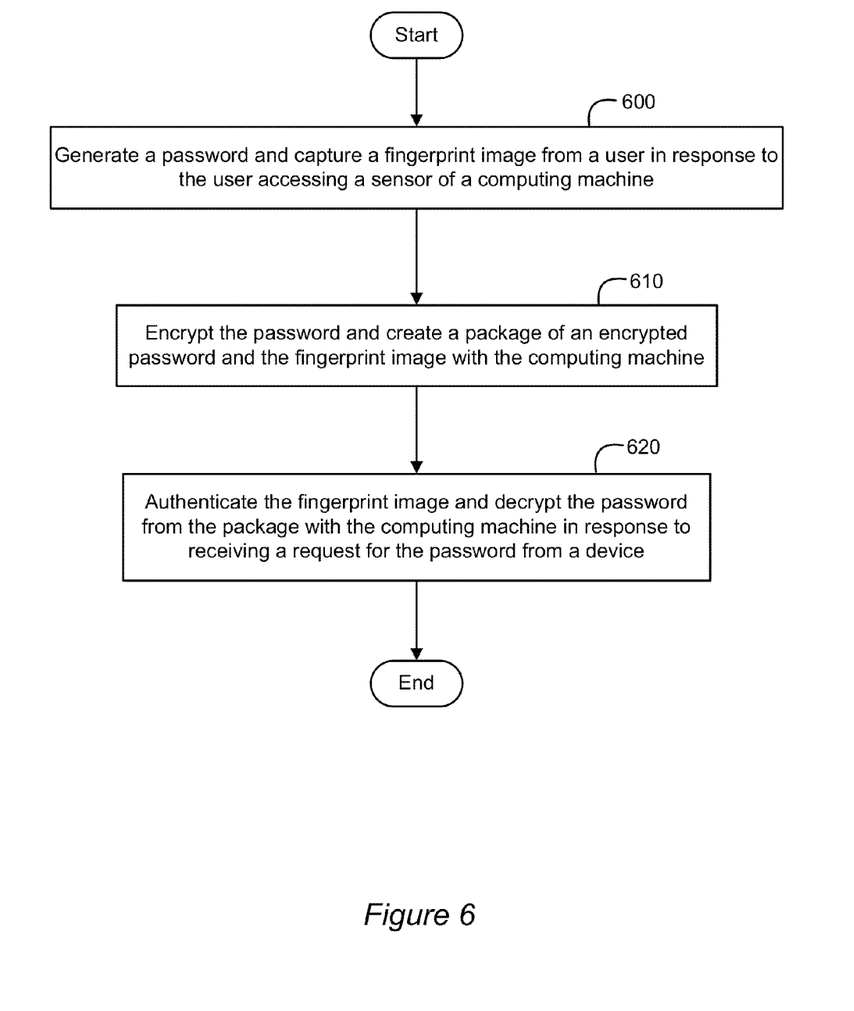
FIG. 6 is a flow chart illustrating a method for authenticating a user according to an embodiment.

FIG. 6 is a flow chart illustrating a method for authenticating a user according to an embodiment. The method of FIG. 6 uses a computing machine with a processor, a sensor, a component, a communication channel, and/or an authentication application. In other embodiments, the method of FIG. 6 uses additional components and/or devices in addition to and/or in lieu of those noted above and illustrated in FIGS. 1, 2, 3, 4, and 5.

As noted above, the authentication application is an application which can independently or in conjunction with the processor manage an authentication of a user. When managing an authentication of a user, the processor and/or the authentication application can initially detect a request to authenticate the user from a device. As noted above, the device can be a desktop, a laptop, a notebook, a tablet, a PDA, a cellular device, and/or any additional device which can send one or more requests as signals or instruction to the processor and/or the authentication application. In one embodiment, the device can operate as a server, a service provider, and/or as a merchant.

Additionally, the computing machine and the device can include one or more communication components configured to allow the device to send one or more requests and the computing machine to receive one or more requests. In response to detecting a request to authenticate the user, the processor and/or the authentication application can notify a sensor that a request has been received. In one embodiment, the processor and/or the authentication application can initially authenticate the device before notifying the sensor of the request. As noted above, the processor and/or the authentication application can authenticate the device by prompting the device to identify itself. The device can provide a device ID to the processor and/or the authentication application to compare to an approved device list. The approved device list can include one or more device IDs of devices which are identified by the processor and/or the authentication application as safe.

In response to authenticating the device, the processor and/or the authentication application can notify the sensor. The sensor can then proceed to detect a user accessing the sensor. As noted above, the sensor is a biometric device configured to capture information from the user. In one embodiment, the sensor can include an image capture device, a fingerprint scanner, and/or any additional device configured to capture information from the user.

A user can access the sensor by touching the sensor with a finger of the user. In response to detecting the user accessing the sensor, the sensor can proceed to capture a fingerprint image from the user and the sensor can generate a password 600. The fingerprint image is an image of the user's finger. The password can be a one-time-password used by the device to verify an identity of the user. In one embodiment, the sensor can additionally encrypt the fingerprint image and/or the password.

The sensor can share the captured fingerprint image and the generated password with a component of the computing machine. The component can be a software or hardware component of the computing machine configured to generate a package of the fingerprint image and the package. The component can additionally decrypt and/or re-encrypt the fingerprint image, the password, and/or the package. In one embodiment, the component can be a firmware driver of the sensor.

When generating the package, the component can bundle the encrypted fingerprint image with the encrypted password as a BLOB (Binary Large Object) 610. In another embodiment, the component can initially decrypt the fingerprint image and/or the password and proceed to re-encrypt the fingerprint image and/or the password. When re-encrypting the fingerprint image and/or the password, the component can use one or more encryption algorithms, one or more signatures, and/or one or more hardware/software tokens local to the component.

In response to generate the package, the component can share the package with the processor and/or the authentication application. The processor and/or the authentication application can then attempt to authenticate the fingerprint image and decrypt the password from the package in response to receiving a request for the password from the device 620.

As noted above, when authenticating the fingerprint image, the processor and/or the authentication can compare the fingerprint image to one or more registered fingerprint images. One or more fingerprint images can correspond to fingerprints of users which are registered and/or authorized to use the computing machine. By comparing the fingerprint image to one or more registered fingerprint images, the processor and/or the authentication application can insure that a password cannot be released for an authorized user of the computing machine.

If no match is found, the processor and/or the authentication application can determine that the user is not authorized to use the computing machine. Additionally, the processor and/or the authorization application can delete the password, the package, and/or the fingerprint image. If the processor and/or the authentication application find a matching registered fingerprint image, the processor and/or the authentication application can determine that the fingerprint image is authenticated and the user is authorized to use the computing machine.

In response, the processor and/or the authentication application can detect a request for the password from the device. If the request for the password is received, the processor and/or the authentication application can proceed to decrypt any encryption of the password from the sensor and/or the component. Once the password has been decrypted, the processor and/or the authentication application can send the decrypted password to the device. As noted above, using the password, the device can verify an identity of the user. The method is then complete. In other embodiments, the method of FIG. 6 includes additional steps in addition to and/or in lieu of those depicted in FIG. 6.

Figure 7:
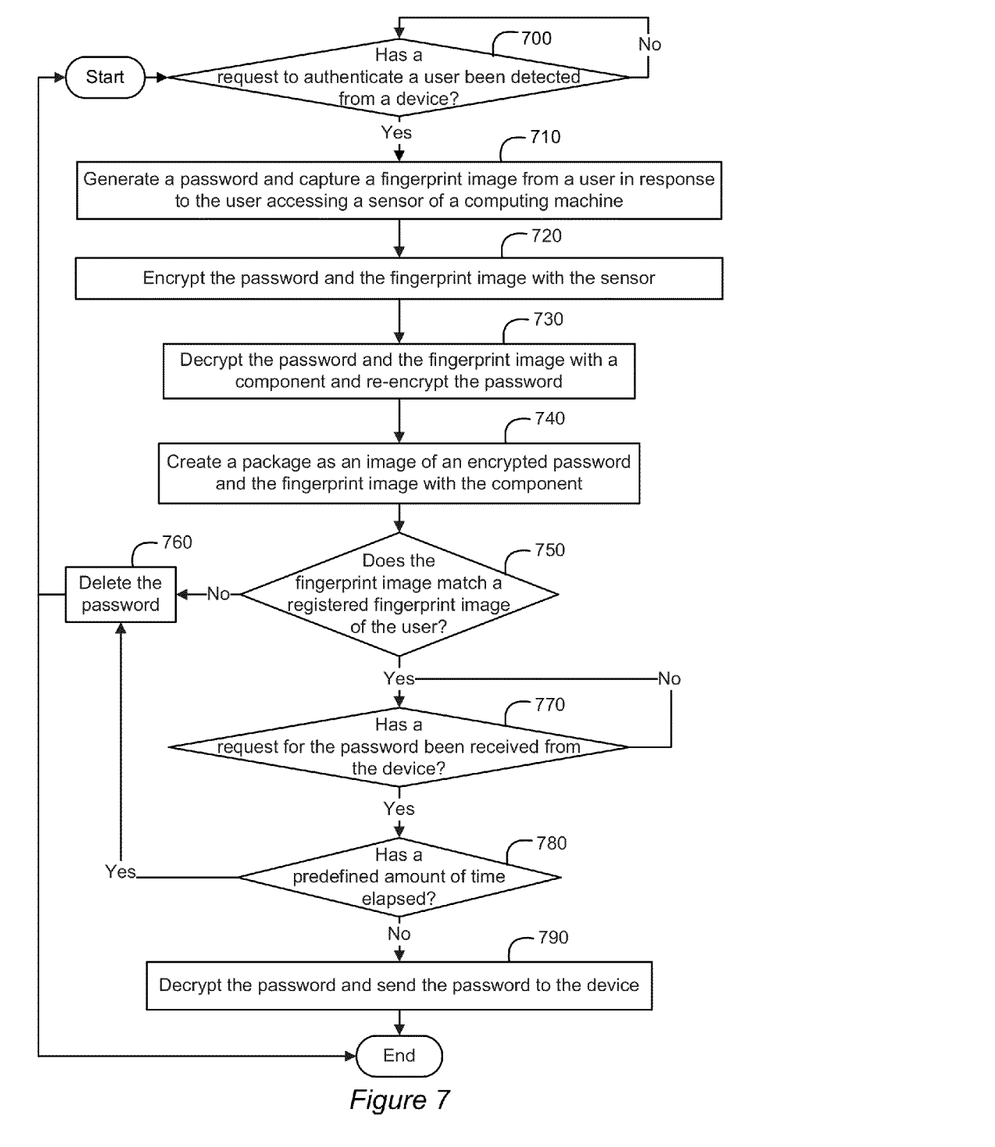
FIG. 7 is a flow chart illustrating a method for authenticating a user according to another embodiment.

FIG. 7 is a flow chart illustrating a method for authenticating a user according to another embodiment. Similar to the method disclosed above, the method of FIG. 7 uses a computing machine with a processor, a sensor, a component, a communication channel, and/or an authentication application. In other embodiments, the method of FIG. 7 uses additional components and/or devices in addition to and/or in lieu of those noted above and illustrated in FIGS. 1, 2, 3, 4, and 5.

As noted above, the processor and/or the authentication application can initially determine whether a request to authenticate a user has been received from a device coupled to the computing machine 700. If no request has been received, the processor and/or the authentication application continue to determine whether the request to authenticate the user has been received. If a request has been received, the processor and/or authentication application can notify a sensor coupled to the computing machine.

In response, the sensor can proceed to detect a user accessing the sensor. If a user is detected to be touching the sensor, the sensor will capture a fingerprint image from the user and the sensor will generate a password 710. In one embodiment, the sensor can additionally encrypt the fingerprint image and/or the password using one or more encryption algorithms, a signature, and/or a hardware/software token 720. The encrypted fingerprint image and the encrypted password can then be passed to a hardware or software component of the computing machine. As noted above, the component can be a firmware driver of the sensor configured to decrypt the fingerprint image and/or the password and then re-encrypt the fingerprint image and/or the password 730.

The component can then proceed to create a package as a BLOB of the fingerprint image and the password 740. The package can then be shared with the processor and/or the authentication application. Using the package, the processor and/or the authentication application can attempt to authenticate the fingerprint image.

As noted above, the processor and/or the authentication application can determine whether the fingerprint image from the package matches a registered fingerprint image 750. As noted above, a registered fingerprint image corresponds to a user registered and authorized to use the computing machine. By authenticating the fingerprint image, the processor and/or the authentication application prevent the release of the password from an unauthorized user. If the fingerprint image does not match any of the registered fingerprints, the processor and/or the authentication application can determine that the user is unauthorized. The processor and/or the authentication application can then proceed to delete the password, the fingerprint image, and/or the package 760.

In another embodiment, if the fingerprint image matches one of the registered fingerprint images, the processor and/or the authentication application can determine that the user is authorized and the fingerprint image is successfully authenticated. The processor and/or the authentication application can then proceed to determine whether a request for the password has been received from the device 770. If no request for the password is received, the processor and/or the authentication application can continue to detect for the request.

If a request for the password has been received, the processor and/or the authentication application can determine whether a predefined amount of time has elapsed 780. As noted above, the predefined amount of time can be defined by the processor, the authentication application, and/or a user of the computing machine. Additionally, the processor and/or the authentication application can determine a time difference between when the user authentication request was first received and when the password request was received. In another embodiment, the processor and/or authentication application can calculate a time difference between when the fingerprint image was authenticated and when the password request was received.

If the predefined amount of time is less than any of the times noted above, the processor and/or the authentication application can determine that the predefined amount of time has elapsed. If the predefined amount of time has elapsed, the processor and/or the authentication application can proceed to delete the password, the fingerprint image, and/or the package 760.

If the predefined amount of time is greater than any of the times noted above, the predefined time has not elapsed and the processor and/or the authentication application will proceed to decrypt the password and provide the decrypted password to the device 790. When providing the decrypted password, the processor and/or the authentication application can send the device the decrypted password. The method is then complete. In other embodiments, the method of FIG. 7 includes additional steps in addition to and/or in lieu of those depicted in FIG. 7.

What is claimed is:

1. A computing machine comprising:
a sensor to capture a fingerprint image from a user and, in response to capturing the fingerprint image, generate a random one-time password, wherein the sensor encrypts the fingerprint image and the password;
a component to receive the encrypted fingerprint image and password from the sensor and to decrypt the fingerprint image and the encrypted password, re-encrypt the password and create a package of the decrypted fingerprint image and the encrypted password; and
a processor to authenticate the fingerprint image from the package prior to sending the password to a requesting device if a request for the password has been received from the requesting device and, in response to authenticating the fingerprint image, to decrypt the encrypted password and send the decrypted password to the requesting device.

2. The computing machine of claim 1 wherein the package is BLOB which includes the fingerprint image and the password.

3. The computing machine of claim 1 wherein another device sends the computing machine the request for the password if attempting to authenticate the user.

4. The computing machine of claim 1 wherein the sensor includes at least one from the group consisting of an image capture device, a fingerprint scanner, and a biometric device.

5. A method for authenticating a user comprising:
generating a random one-time password in response to capturing a fingerprint image from a user accessing an image capture device of a computing machine;
encrypting, by the image capture device, the password and the fingerprint image;

passing the encrypted password and fingerprint image to a component;

decrypting, by the component, the encrypted password and the fingerprint image, re-encrypting the password and creating a package of the encrypted password and the decrypted fingerprint image with the computing machine; and authenticating the fingerprint image and, in response to the authenticating, decrypting the encrypted password from the package with the computing machine if a request for the password is received from a requesting device prior to sending the password to the requesting device.

6. The method for authenticating a user of claim 5 further comprising detecting a request to authenticate the user from the requesting device.

7. The method for authenticating a user of claim 5 further comprising determining whether a predefined time has elapsed before authenticating the fingerprint image.

8. The method for authenticating a user of claim 7 further comprising sending the decrypted password to the requesting device if the predefined time has not elapsed.

9. The method for authenticating a user of claim 8 further comprising deleting the password on the computing machine in response to sending the device the decrypted password.

10. The method for authenticating a user of claim 7 further comprising deleting the password from the computing machine if the predefined time has elapsed.

11. A non-transitory computer readable medium comprising instructions that if executed cause a processor to:

capture a fingerprint image from a user and generate a random one-time password in response to capture of the fingerprint image of the user accessing an image capture device and receiving a request for authentication of the user from a requesting device;

encrypt, at the image capture device, the password and the fingerprint image;

pass the encrypted password and fingerprint image to a component;

decrypt, at the component, the encrypted password and the fingerprint image, re-encrypt the password and create an image package of the encrypted password and the decrypted fingerprint image; and authenticate the fingerprint image and, in response to authentication of the fingerprint image, decrypt the encrypted password in response to receiving a request for the password from the requesting device prior to sending the password to the requesting device.

12. The computer readable medium comprising instructions of claim 11 wherein to authenticate the fingerprint image includes comparing the fingerprint image to a registered fingerprint image and the processor deletes the password if the fingerprint image fails authentication.

* * * * *